BIBBEE & RAND.
Potato Digger.
No. 104,251.  Patented June 14, 1870.
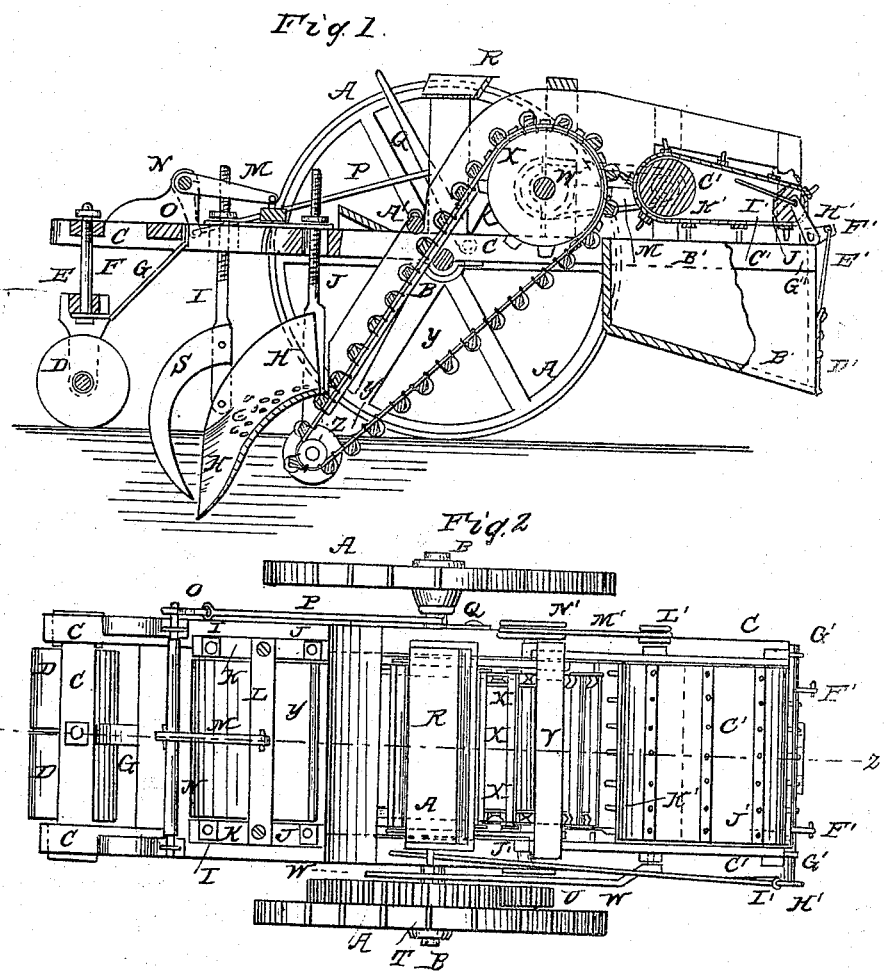

UNITED STATES PATENT OFFICE.

DANIEL BIBBEE AND WILLIAM RAND, OF LETART FALLS, OHIO.

IMPROVEMENT IN POTATO-DIGGERS.

Specification forming part of Letters Patent No. 104,251, dated June 14, 1870.

*To all whom it may concern:*

Be it known that we, DANIEL BIBBEE and WILLIAM RAND, of Letart Falls, Meigs county, in the State of Ohio, have invented a new and useful Improvement in Potato-Digger; and we do hereby declare that the following is a full, clear, and exact description thereof, which will enable others skilled in the art to make and use the same, reference being had to the accompanying drawing, forming part of this specification, in which—

Figure 1 is a vertical longitudinal section of our improved machine, taken through the line $x\ x$, Fig. 2. Fig. 2 is a top view of the same.

Our invention has for its object to furnish an improved potato-digger which shall be so constructed as to raise the potatoes and soil, separate the potatoes from the soil and from the weeds and grass that may be raised with them, and deposit the potatoes in a box, and which shall at the same time be simple in construction and operation; and it consists in the construction and combination of the various parts of the machine, as hereinafter more fully described.

A represents the drive-wheels, one of which is rigidly attached to the axle B, and C the frame of the machine.

The roller D supports the machine at its front end, and is made in two parts and pivoted to the frame E, which is, in turn, similarly connected with the frame C by means of bolt F. G is a strengthening-brace of frame E.

H represents a scoop, which is secured at its sides to bars I J, which are adjustably suspended from or connected with the bars K by means of screw-nuts on their upper ends, said bars K being connected by a bar, L.

M is a bar, pivoted at one end to bar L, and rigidly attached at its front end to a rock-shaft, N, arranged in bearings on the frame. The arm O of this shaft is connected by a rod, P, to a hand-lever, Q, which is pivoted to the frame near the driver's seat R.

S are curved weed-cutters attached to the scoop H.

A gear-wheel, T, is attached to one of the drive-wheels, and meshes with a gear-wheel, U, which is arranged to slide on the end of the shaft V, and at the same time carry it with it in its revolution. W is a hand-lever to throw said wheel U into and out of gear with T. The shaft V also carries the chain-wheels X, on which and the smaller wheels Z on a shaft having bearings in the lower ends of rods J the carrier Y is arranged. This carrier is composed of chains and cross-slats, similarly to those used in hay-loaders, thrashing-machines, &c.

A' is a roller, so arranged as to crush any lumps or clods of soil that may be carried up by the carrier, and are too large to pass through the spaces between the slats.

B' is a box for receiving the potatoes, and C' a weed-carrier having cross-slats armed with teeth, and arranged on rollers J' K' above the said box. The bottom of the latter is inclined rearwardly and a door provided at its rear side, which is hinged at its upper edge and secured by bolts D' passing through keepers attached to said door and the bottom of the box. These bolts are conveniently operated from the driver's seat by means of rods E', shaft G', with its arms F' H', and rod I', whose arrangement is clearly shown in the drawing. The weed-carrier C' is operated from the shaft V by means of pulleys L' N' and belt or band M'.

It will be seen that as the machine advances the potatoes, soil, weeds, &c., taken up by the scoop H will be carried up by the carrier Y, and, while the weeds will be taken from said carrier by the carrier C' and delivered on the ground in rear of the machine, the potatoes and soil will fall into the box B, from which they can be discharged at proper times by withdrawing the keepers D' and allowing the hinged door to swing open.

The position of the scoop may be vertically adjusted to suit the soil or depth at which the potatoes are deposited by operating the lever Q, and thus raising the bars L and K to which the rods I J are connected.

Having thus described our invention, we claim as new and desire to secure by Letters Patent—

An improved potato-digger formed by the combination of the drive-wheels A, axle B, frame C, roller D, adjustable plow-plate or scoop H, weed-cutters S, carrier or separator Y, clod-crushing rollers A', receiving-box B', and weed-carrier C' with each other, said parts being constructed and operating substantially as herein shown and described, and for the purpose set forth.

DANIEL BIBBEE.
WILLIAM RAND.

Witnesses:
ROBERT BUCHANAN,
STEPHEN SPENCER HAYMAN.